United States Patent
Sugahara

[11] Patent Number: 5,946,382
[45] Date of Patent: Aug. 31, 1999

[54] BUTTON TELEPHONE EQUIPMENT FOR DISPLAY OF CALLING PUBLIC LINE NUMBER

[75] Inventor: Yoshinobu Sugahara, Koriyama, Japan

[73] Assignee: Hitachi Telecom Technologies, Ltd., Koriyama, Japan

[21] Appl. No.: 08/927,681

[22] Filed: Sep. 11, 1997

[30] Foreign Application Priority Data

Sep. 11, 1996 [JP] Japan .................................. 8-261227

[51] Int. Cl.⁶ ............................ H04M 1/00; H04M 1/56
[52] U.S. Cl. ............................................ 379/157; 379/142
[58] Field of Search ................................... 379/142, 140, 379/141, 157, 158

[56] References Cited

U.S. PATENT DOCUMENTS

| | | | |
|---|---|---|---|
| 5,396,548 | 3/1995 | Bayerl et al. | 379/157 |
| 5,550,905 | 8/1996 | Silverman | 379/157 |
| 5,754,635 | 5/1998 | Kim | 379/157 |
| 5,799,074 | 8/1998 | Mano et al. | 379/157 |

*Primary Examiner*—Paul Loomis
*Attorney, Agent, or Firm*—Foley & Lardner

[57] ABSTRACT

This button telephone equipment comprising a plurality of button telephone apparatus 2a–2m having a plurality of the public line button 23 and a display for displaying the sender's information, and an auto-exchange apparatus 1, this auto-exchange apparatus 1 detecting the operation of the public line button during displaying the incoming call or during displaying the holding on the ON-HOOK status, and extracting the communication line data with reference to the incoming call on the basis of the data corresponding to the public line button of the operated button telephone apparatus, and extracting the sender's telephone number on the basis of the extracted communication line data, and extracting the sender's name on the basis of the extracted sender's telephone number, and then displaying the sender's telephone number and the sender's name on the display 22 the operated button telephone apparatus.

4 Claims, 10 Drawing Sheets

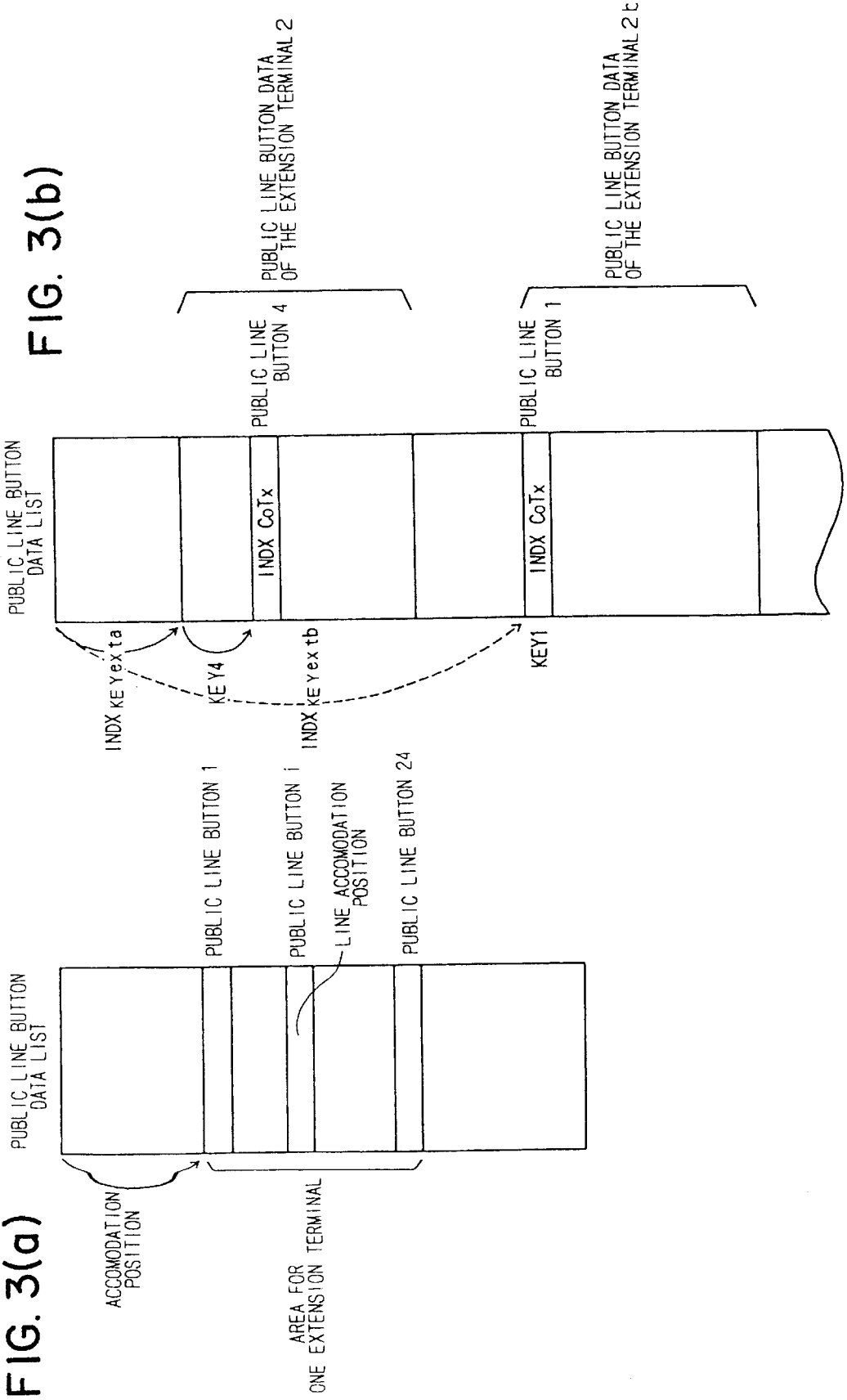

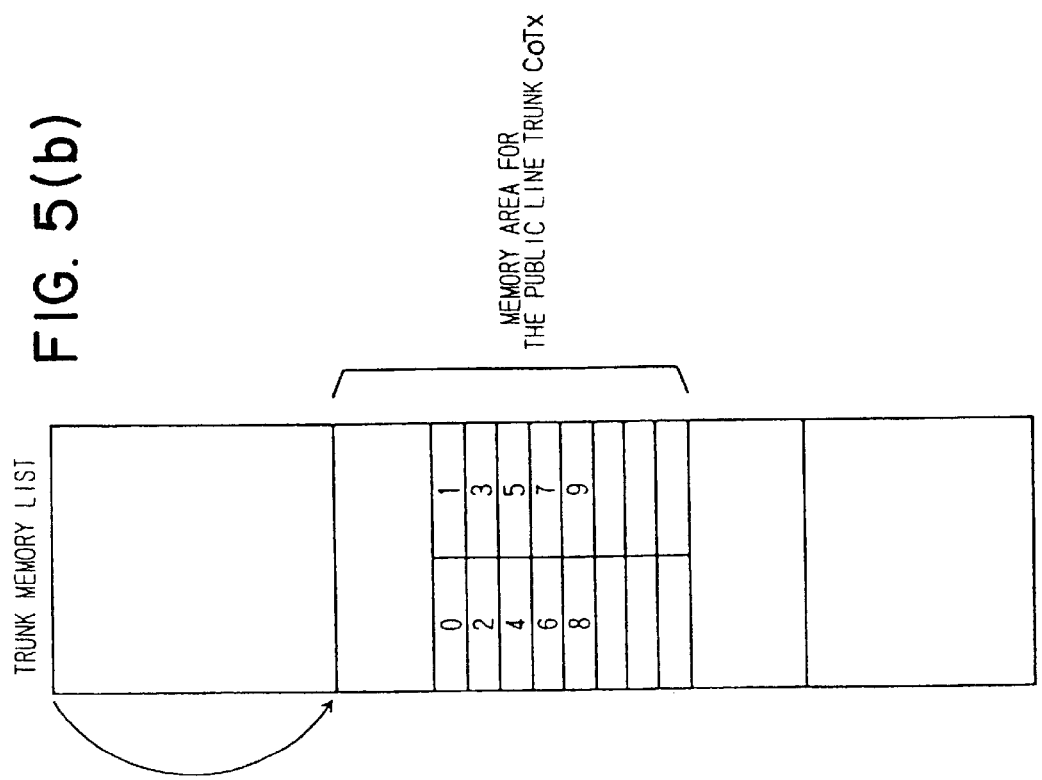
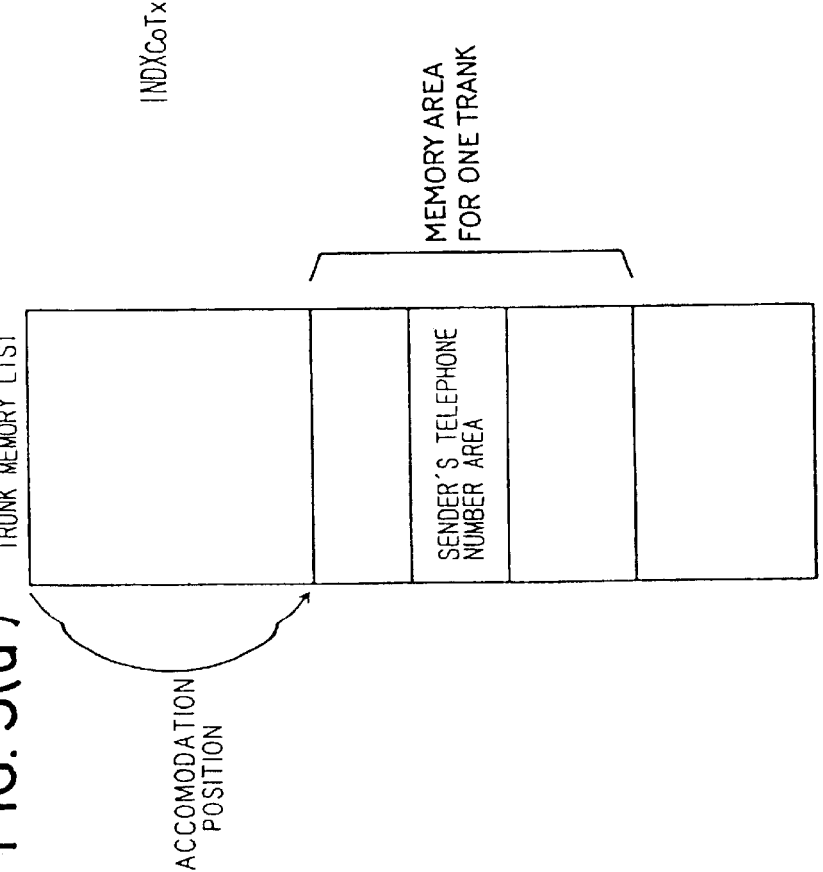

BUTTON TELEPHONE EQUIPMENT FOR DISPLAY OF CALLING PUBLIC LINE NUMBER

CROSS-REFERENCES TO RELATED APPLICATIONS

This application claims all benefits accruing under 35 U.S.C §119 whom the Japanese Patent Application No. 8-261227, filed Sep. 11, 1996.

BACKGROUND OF THE INVENTION

1. Field of the Invention

This invention relates to a button telephone equipment to execute the. line exchange by using a plurality of button telephone apparatus having public line buttons containing a communication line.

2. Description of the Related Art

A conventional button telephone equipment having a plurality of button telephone apparatus can indicate an incoming call status on a public line button of the button telephone apparatus, the public line button containing a plurality of telephone lines.

According to this button telephone equipment, the button telephone apparatus can receive the incoming call by depressing the public line button of indicating the incoming call status and can send the outgoing call by depressing the public line button in the unused status. Further, when the user of the button telephone apparatus transfers the telephone line to another button telephone apparatus, the button telephone apparatus makes the public line button in the holding status by holding the telephone line by the holding operation and can receive the holding of the telephone line in the holding status by depressing the public line button of indicating the holding status.

However, according to this conventional button telephone equipment, on the reception of the incoming call, the user can not identify the sender's name without receiving the incoming call. Also, on the reception of the holding, the transfer transfers the telephone line to another button telephone apparatus after telling the sender's name to the user of the another button telephone apparatus. However, when the user can't hear the sender's name from the transfer, he can not identify the sender's name without receiving the holding.

Recently, the service of the sender's telephone number notification began. According to this service, the conventional button telephone equipment can display the sender's telephone number on the display of the button telephone apparatus and display the sender's name on the basis of the sender's telephone number. However, when having a plurality of the incoming call line or the holding line, the button telephone apparatus can't display all sender's number or name with respect to the incoming call line or the holding line on the display. Therefore, the user can't recognize all the sender's name with respect to the incoming call line or the holding line.

Also, in order to solve these above-mentioned problems, it is generally known to use the telephone apparatus provided with a large display for displaying the plurality of the sender's telephone number and to provide a display separate from the button telephone apparatus.

However, this has a drawback in that the button telephone apparatus must provide newly the display which causes too high cost. In order to solve these above-mentioned problems, this invention is to provide the button telephone equipment that can display all sender's information before receiving the incoming call or the holding, even if having simultaneously a plurality of the incoming call line or the holding line.

BRIEF SUMMARY OF THE INVENTION

The button telephone equipment according to one aspect of the present invention comprises a plurality of button telephone apparatus having a plurality of public line buttons containing communication line and a display for displaying a sender information, and an auto-exchange apparatus controlling the outside line access and the extension line access of the plurality of the button telephone apparatus, the auto-exchange apparatus having a public line button data list for storing the communication line to be allotted to the public line button of each button telephone apparatus and a trunk memory list for storing temporally the sender's information corresponding to the public line trunk with respect to the incoming call, wherein the auto-exchange apparatus detecting the operation in the ON-HOOK status of the public line button during displaying the incoming call or during displaying the holding, extracting the communication line data with respect to the incoming call from the public line button data list on the basis of the data corresponding to the public line button of the operated button telephone apparatus, extracting the sender's information from the trunk memory list on the basis of the extracted communication line data, and then displaying the extracted sender's information on the display of the operated button telephone apparatus.

The button telephone equipment according to another aspect of the present invention comprises a plurality of button telephone apparatus having a plurality of public line buttons containing communication line and a display for displaying a sender's information, and an auto-exchange apparatus controlling the outside line access and the extension line access of the plurality of the button telephone apparatus, the auto-exchange apparatus having a public line button data list for storing the communication line to be allotted to the public line button of each button telephone apparatus, a sender's telephone number management list for storing a sender's telephone number and a sender's name corresponding to the sender's telephone number and a trunk memory list for storing temporally the sender's telephone number of each public line trunk with respect to the incoming call, wherein the auto-exchange apparatus detecting the operation in the ON-HOOK status of the public line button during displaying the incoming call or during displaying the holding, extracting the communication line data with respect to the incoming call from the public line button data list on the basis of the data corresponding to the public line button of the operated button telephone apparatus, extracting the sender's telephone number from the trunk memory list on the basis of the extracted communication line data, extracting the sender's name from the sender's telephone number management list on the basis of the extracted sender's telephone number, and then displaying the extracted sender's telephone number and the extracted sender's name on the display of the operated button telephone apparatus.

According to this invention, since the user can individually recognize each the sender's information on the display before receiving the incoming call or before receiving the holding by operating the public line button in lighting in ON-HOOK status during displaying the incoming call or during the displaying the holding even with simultaneously plural existence of the incoming call line or the holding line, the most suitable receiver or the most suitable holding receiver can receive the incoming call or the holding by recognizing the sender's information. Particularly, with a plurality of the lines, he can select a communication line of top priority to receive the incoming call or the holding.

BRIEF DESCRIPTION OF THE SEVERAL VIEWS OF THE DRAWINGS

FIG. 3(a) is a basic constitutional view of the public line button data list; and FIG. 3 (b) is an operational explanatory view.

FIG. 5(a) is a basic constitutional view of the trunk memory list; and FIG. 5(b) is an operational explanatory view.

FIG. 6 is an external view showing a part of the button telephone apparatus (extension terminal) 2a.

DETAILED DESCRIPTION OF THE INVENTION

Figure 1:
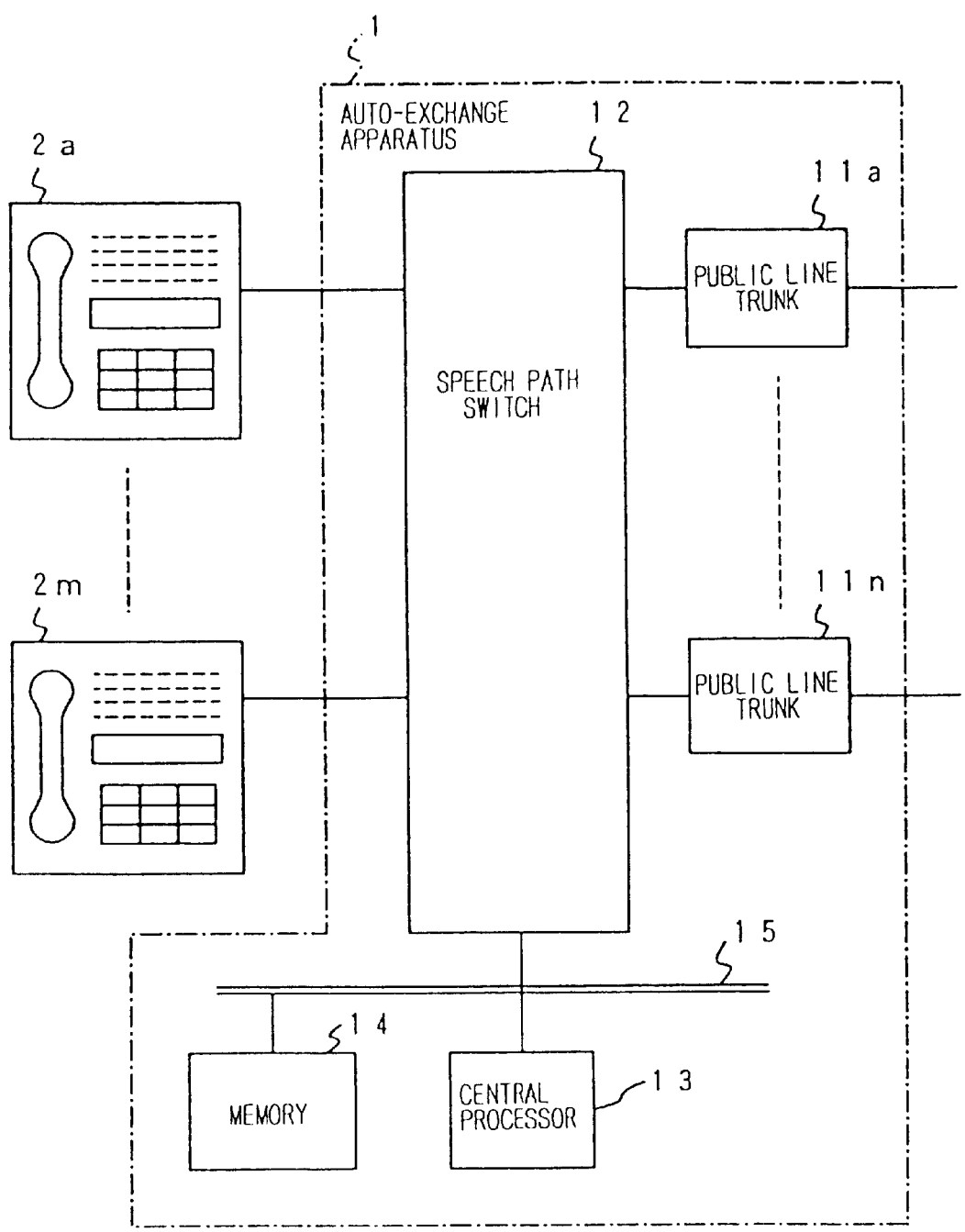
FIG. 1 is a constitutional view of the button telephone equipment according to this invention.

FIG. 1 is a block diagram showing an embodiment of the button telephone equipment according to this invention which comprises an auto-exchange apparatus I and a plurality of button telephone apparatuses 2a–2m connected to this auto-exchange apparatus 1.

The auto-exchange apparatus 1 comprises a plurality of public line trunks 11a–11n connected to another auto-exchange apparatus or public line, a speech path switch 12 exchangeably connecting these button telephone apparatus 2a–2m to these public line trunks 11a–1n, a central processor 13 for controlling whole the button telephone apparatus including a connection management etc. of the speech path switch 12, a memory 14 for storing a control program in the central processor 13 and various control data for such control, and management data, and a bus 15 connecting among the speech path switch 12, the central processor 13 and the memory 14.

Figure 2:
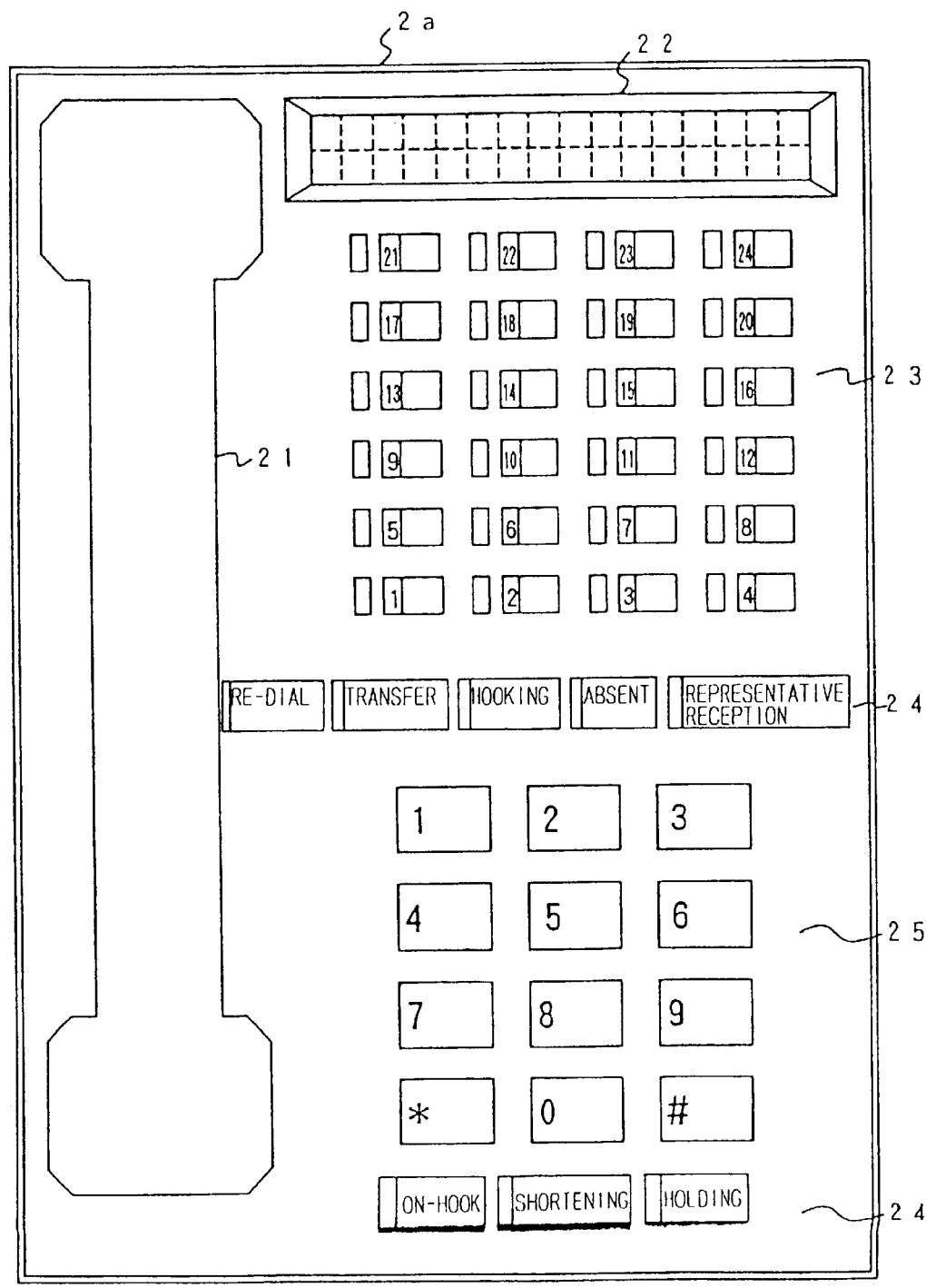
FIG. 2 is an external view showing an example of the button telephone apparatus shown in FIG. 1.

FIG. 2 is an external view showing an example of the button telephone apparatus 2a, which comprises a handset 21 used in the conversational speech communication, a display 22 for displaying in the character the status of the button telephone apparatus and the status of the terminal appliance which communicates with this button telephone apparatus, a plurality of public line button containing the communication lines etc. and used for one touch auto dial etc., a plurality of service function keys 24 used for the particular service of the redial and the holding function, and a dial key (ten key) 25 used for designating the outgoing call object. Each of the public line buttons 23 has a status lamp which lights arbitrary.

FIG. 3(a) is a constitutional view for the public line button data list stored in the memory 14. This public line button data list registers the communication line etc. on the plurality of public line button 23 provided on the button telephone apparatus 2a–2m by operating the button telephone apparatus 2a–2m. The content is comprised for each the button telephone apparatus (extension terminals) 2a–2m, which stores the communication line etc. accommodated in the public line button 23, as the line accommodation position information.

Figure 4B:
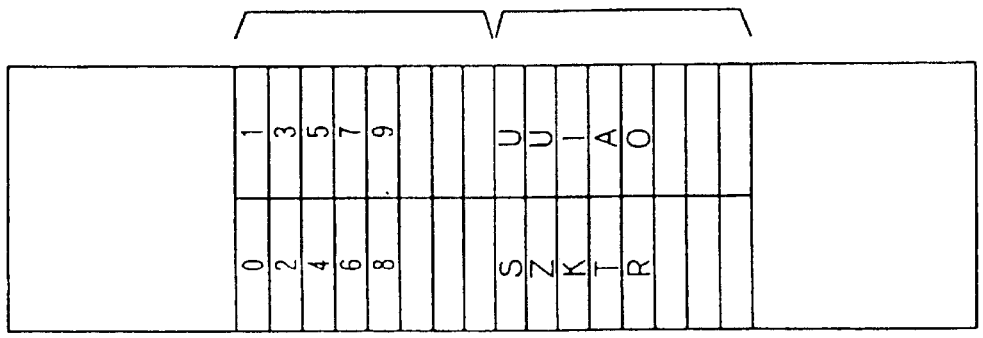
FIG. 4(b) is an operational explanatory view.
Figure 4A:
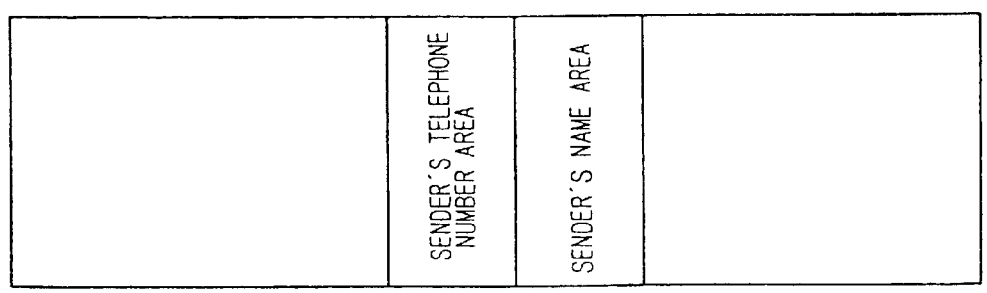
FIG. 4(a) is a basic constitutional view of the sender's telephone number management list.

FIG. 4(a) is a constitutional view for the sender's telephone number management list stored in the memory 14. This sender's telephone number management list manages the sender's telephone number and the sender's name corresponding to the sender's telephone number. These sender's telephone number and these sender's name are registered in the sender's telephone number management list by operating the button telephone apparatus 2a–2m.

FIG. 5(a) is a constitutional view for the trunk memory list stored in the memory 14. This trunk memory list stores temporally the sender's telephone number received at each call of the communication line by process of the central processor 13. The content is comprised for each the accommodation position unit (trunk unit) of the communication trunk, which stores the sender's telephone number in each trunk area.

Figure 6:
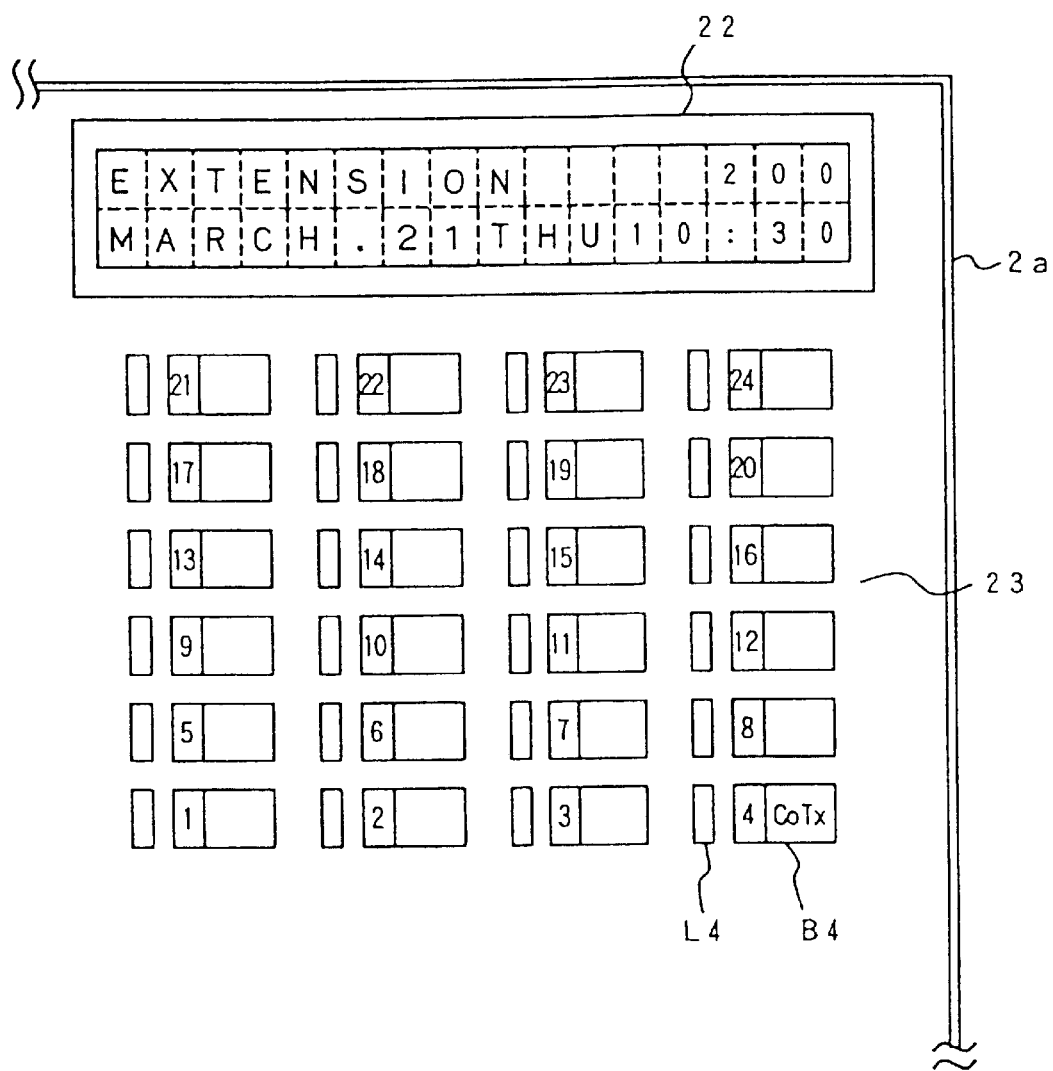

Next, the operation of the button telephone equipment according to this invention will be hereinafter discussed. In the following explanation, an example using the button telephone apparatuses 2a,2b will be discussed. FIG. 6 is a constitutional view showing a part of the button telephone apparatus (extension terminal) 2a. The display 22 can display 32 characters (16 characters×2 lines) which includes alphabets, numeral, japanese character etc. When this extension terminal 2a is at the unused status, this extension terminal 2a displays the present time & date and the extension number 200 of the self terminal as shown in FIG. 6. Also, the extension terminal 2a can display its service status along the service function. In this embodiment, it is discussed with respect to displaying the sender's information in alphabets character, but it is the same even in Chinese or Japanese character.

This extension terminal 2a has 24 units of the public line buttons 23, the fourth of which B4 contains the public line trunk 11a (COTx). This extension terminal 2a has a lamp L4 corresponding to the public line button B4, wherein the lamp L4 indicates the status of the public line trunk (COTx).

That is to say, when the public line trunk (COTx) is at the unused status, the lamp L4 corresponding to the public line button B4 flickers. When the incoming call in the public line trunk (COTx) occurs, the lamp L4 flickers in red in order to press the user to receive the incoming call of the public line trunk (COTx). When the public line trunk (COTx) is at the speech status by receiving the incoming call, the lamp L4 lights in green. When the public line trunk (COTx) is used by others, the lamp L4 lights in red. Furthermore, when the public line trunk (COTx) is at the holding by others, the lamp L4 flickers slowly in red. When the public line trunk (COTx) is at the holding by oneself, the lamp L4 flickers slowly in green. The user can discriminate the using status of the public line trunk (COTx) by oneself or others on the basis of the green or the red in the lamp L4.

Figure 7:
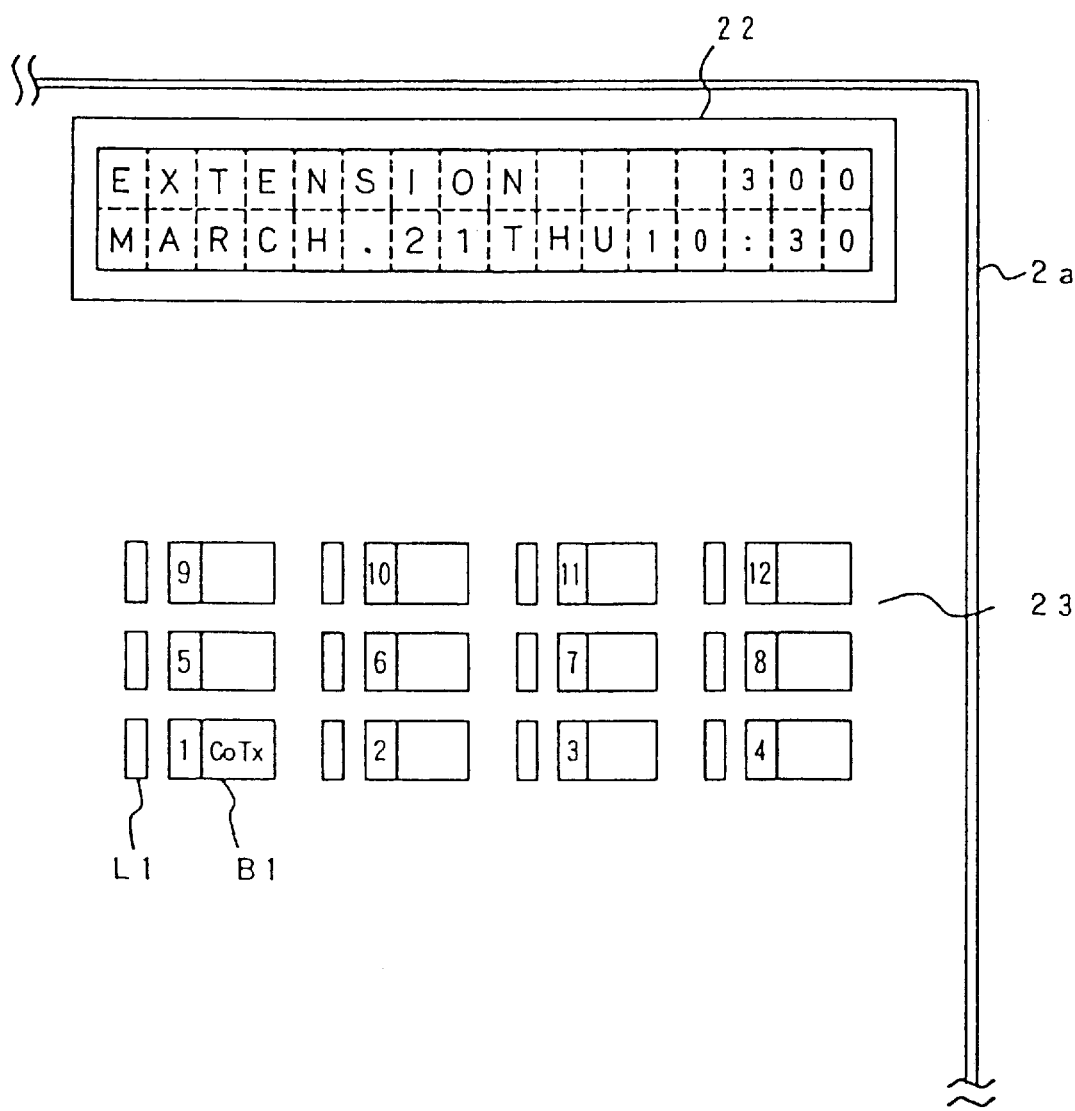
FIG. 7 is an external view showing a part of the button telephone apparatus (extension terminal) 2b.

FIG. 7 is a constitutional view showing a part of the extension terminal 2b. The display 22 displays the extension telephone number 300 as the corresponding terminal number of the extension terminal 2b. The extension terminal 2b has 12 units of the public line button 23, wherein the public line button B1 contains the public line trunk (COTx) as same as the public line button B4 of the extension terminal 2a.

Figure 8:
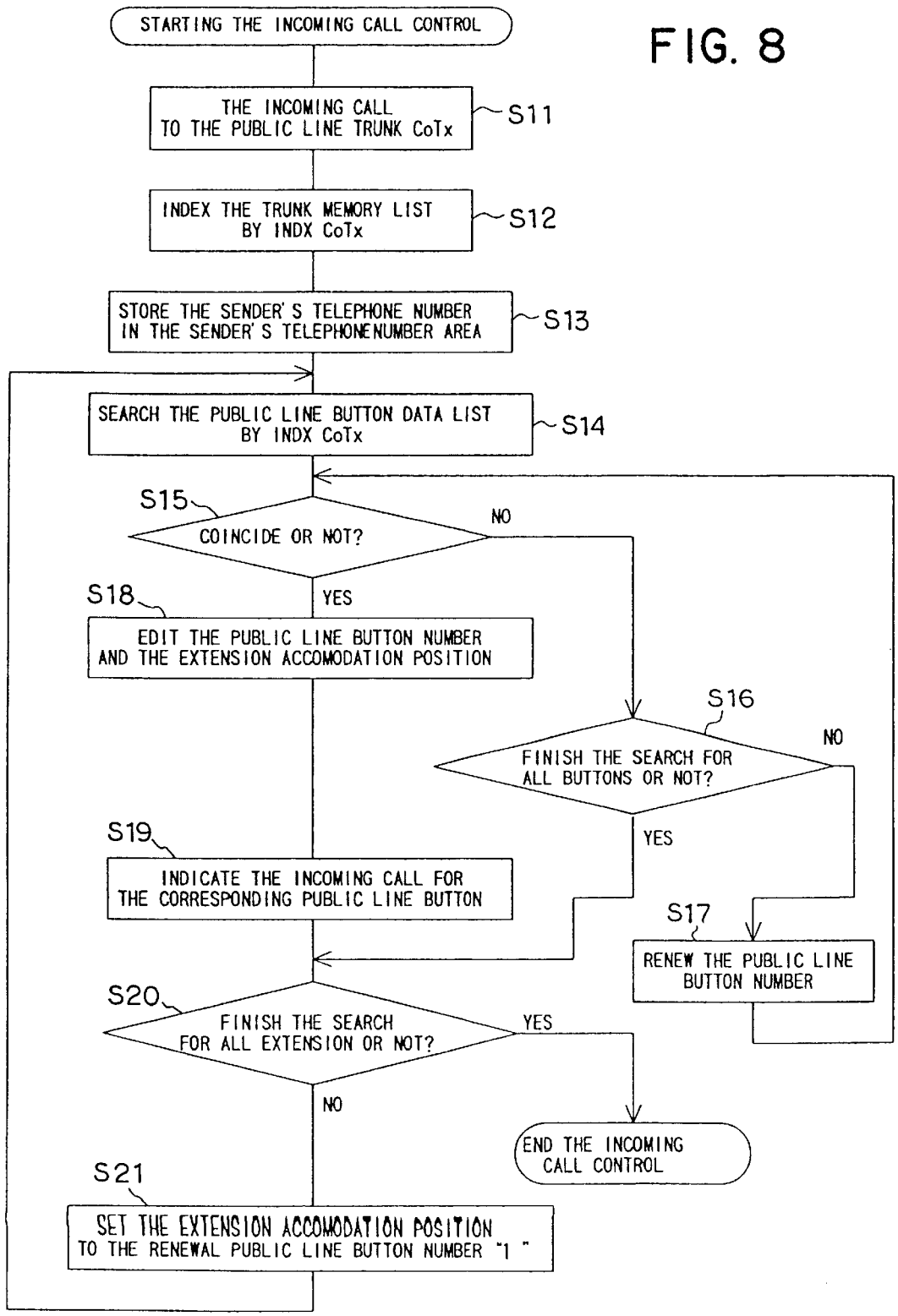
FIG. 8 is a flow chart for explaining the incoming call control process.

Next, an incoming call control process will be hereinafter described with reference to the flow chart in FIG. 8, wherein the incoming call control process executes the operation for storing the sender's information in the incoming call and the operation for controlling the display of the public line button. Now, when the incoming call arrives at the public line trunk (COTx) (Step S11), the central processor 13 detects the incoming call and indexes the trunk memory list by the accommodation position information INDXCOTx of the public line trunk COTx, as shown in FIG. 5(b) (Step S12), thereby storing the sender's telephone number '0123456789' in the memory area of the public line trunk COTx (Step S13).

Then, the central processor 13 searches the public line button data list by the accommodation position information INDXCOTx of the public line trunk (COTx), and searches any of the button telephone apparatus or any of the public line button in which the public line trunk (COTx) is contained (Step S14, S15).

As the public line button data list is comprised for each extension terminals 2a–2m unit, the central processor 13 searches the public line button number which is being renewed for each extension line accommodation positions (Step S16, S17), and when the number coincides (Step S15), the central processor 13 edits the line accommodation position information and the public line button information on the basis of the index datum (Step S18), thereby specifying the extension terminal containing the public line trunk COTx and the public line button.

Since the public line button B4 of the extension terminal 2a accommodates the public line trunk (COTx) in this example, the central processor 13 edits and specifies the line accommodation position information INDXKEYexta and the public line button information KEY4.

Thus, when the extension terminal 2a and the public line button B4 are specified, the central processor 13 controls the lamp corresponding to the public line button B4, the lamp flickering quickly in red so as to notice the incoming call (Step S19).

When the central processor 13 ending the incoming call display control to the extension terminal 2a, the central processor 13 continues to search whether the extension terminal to be the object of another incoming call display control exists or not (Step S20, S21).

Since the public line trunk (COTx) is also accommodated in the public line button B1 of the extension terminal 2b in this example, the central processor 13 by operating Steps S14–S19 edits the line accommodation position information INDXKEYexta and the public line button information KEY1, and specifies the extension terminal 2b and the public line button B1. Thus, when the extension terminal 2b and the public line button B1 are specified, the central processor 13 controls the lamp corresponding to the public line button B1, the lamp flickering quickly in red so as to notice the incoming call. When the central processor 13 finishes the search operation to all button telephone apparatus (extension terminal) 2a–2m, ending the incoming call control process.

Figure 9:
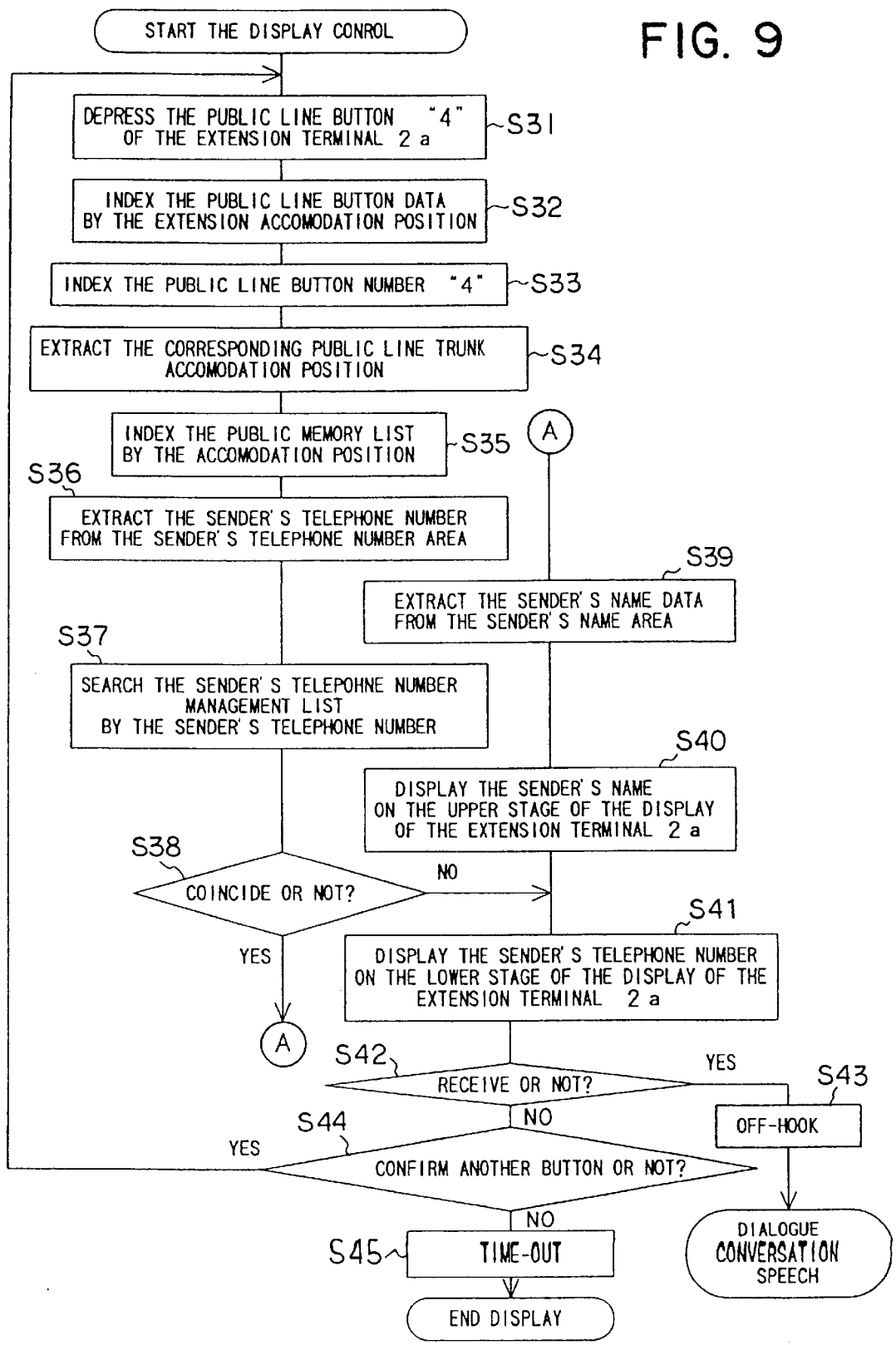
FIG. 9 is a flow chart for explaining the display control process.

Next, with reference to the flow chart shown in FIG. 9, a display control process will be described hereinafter, wherein the display control process is for confirming the sender's information in the incoming call line or in the holding line by depressing the public line button with the lamp flickering before receiving the incoming call or the holding. In the following discussion, a procedure in a case of operation of the public line button B4 of the extension terminal 2a will be explained, but it is the same in a case of operation of another public line button during flickering.

First, upon depression of the public line button B4 of the extension terminal 2a during displaying the incoming call in ON-HOOK status (Step S31), the central processor 13 indexes, as shown in FIG. 3(b), the public line button data list by the accommodation position information INDXKEYexta of the extension terminal 2a (Step S32). Further, the central processor 13 indexes the public line button data list by the position information KEY4 of the public line button B4 (Step S33), thereby extracting the accommodation position information INDXCOTx of the public line trunk (COTx) from the public line button data list (Step S34).

Then, the central processor 13 indexes, as shown in FIG. 5(b), the trunk memory list by the accommodation position information INDXCOTx of the extracted public line trunk (COTx) (Step S35), thereby extracting the sender's telephone number '0123456789' from the memory area of the public line trunk (COTx) (Step S36).

Then, the central processor 13 searches the sender's telephone number management list by the extracted sender's telephone number (Step S37). When the sender's telephone number coincides (Step S38), the central processor 13 extracts the sender's name data from the sender's name area corresponding to the sender's telephone number (Step S39). Thereby, the name 'SUZUKI TARO' can be extracted.

Then, the central processor 13 displays the extracted sender's name on the upper stage of the display 22 of the extension terminal 2a with the depression of the public line button (Step S40). Similarly, the central processor 13 displays the sender's telephone number corresponding to the sender's name on the lower stage of the display 22 (Step S41).

Figure 10:
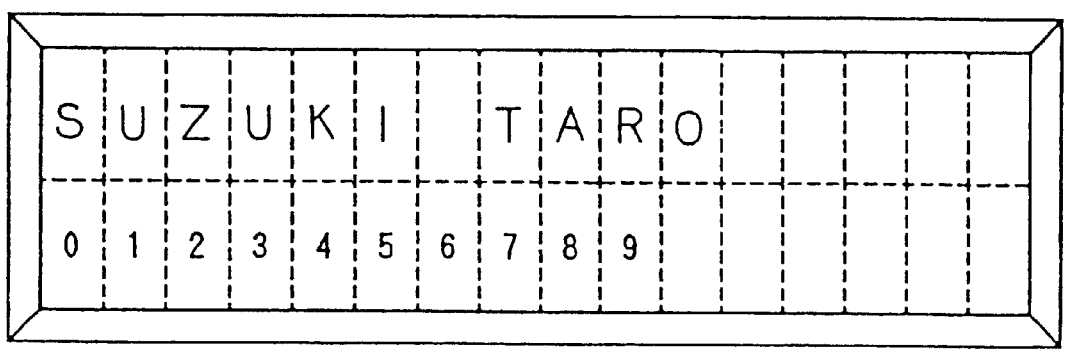
FIG. 10 is a display example of the sender's information displayed on the display.

Thus, as shown in FIG. 10, the sender's information of the sender's name 'SUZUKI TARO' and its sender's telephone number '0123456789' is displayed on the display 22. The user of the extension terminal 2a can recognize the sender's information by means of the display 22. When the user intends to receive the incoming call from 'SUZUKI TARO' (Step S42), the extension terminal 2a executes the dialogue conversation speech status with the line by operating OFF-HOOK (Step S43).

When the user doesn't intend to receive the incoming call (Step S42), the user can notify to a suitable person to receive the incoming call. When the extension terminal 2a has another incoming call and when the user intends to recognize the sender's name etc. (Step S44), the user depresses the public line button (Step S31), thereby repeating these procedures after Step S31. When the user dosen't intend to recognize it (Step S44), the user leaves the extension terminal 2a as it is, so that the self extension telephone number of the extension terminal 2a and the present time are displayed on the display 22 of the extension terminal 2a by the time-out (Step S45).

To this end, when the sender's name corresponding to the sender's telephone number is not registered in the sender's telephone number management list (Step S38), the central processor 13 displays the sender's telephone number on the lower stage of the extension terminal 2a (Step S41).

According to this invention, since the user can individually recognize each the sender's information on the display before receiving the incoming call or before receiving the holding by operating the public line button during displaying the incoming call or during displaying the holding in ON-HOOK status even with simultaneously plural existence of the incoming call line or the holding line, the most suitable receiver or the most suitable holding receiver can receive the incoming call or the holding by recognizing the sender's information. Particularly, with a plurality of the lines, he can select a communication line of top priority to receive the incoming call or the holding.

I claim:

1. An auto-exchange apparatus for controlling line access among a plurality of button telephone apparatuses and respective communication lines for the button telephone apparatuses, each button telephone apparatus having a plurality of public line buttons respectively accommodating a plurality of public line trunks connecting with the corresponding communication line, and having a display for displaying sender's information, the auto-exchange apparatus comprising:

a sender's information detection unit for detecting the sender's information corresponding to one of the public line trunks in response to an incoming call to the one public line trunk;

a public line button list for storing the public line trunks allotted to each of the public line buttons in each of the public telephone apparatuses;

a trunk memory list for temporally storing the sender's information corresponding to the one public line trunk detected by the sender's information detection unit;

a public line button detection unit for detecting operation of the public line button corresponding to the one public line trunk of the incoming call and operation of a holding button in one of the button telephone apparatuses while the one button telephone apparatus is in an ON-HOOK state; and a control unit for reading out the public line trunk from the public line trunk button list corresponding to the public line button detected by the public line button detection unit, for reading out the sender's information corresponding to the public line trunk read out from the trunk memory list, and for displaying the sender's information on the display of the one button telephone apparatus with reference to the operation of the public line button detected by the public line button detection unit.

2. An auto-exchange apparatus for controlling line access among a plurality of button telephone apparatuses and respective communication lines for the button telephone apparatuses, each button telephone apparatus having a plurality of public line buttons respectively accommodating a plurality of public line trunks connecting with the corresponding communication line, and having a display for displaying sender's information, the auto-exchange apparatus comprising:

a sender's information detection unit for detecting the sender's information corresponding to one of the public line trunks in response to an incoming call to the one public line trunk;

a public line button list for storing the public line trunks allotted to each of the public line buttons in each of the public telephone apparatuses;

a trunk memory list for temporally storing the sender's information corresponding to the one public line trunk detected by the sender's information detection unit;

a sender's number management list for storing a sender's number and a sender's name corresponding to the sender's information;

a public line button detection unit for detecting operation of the public line button corresponding to the one public line trunk of the incoming call and operation of a holding button in one of the button telephone apparatuses while the one button telephone apparatus is in an ON-HOOK state; and a control unit for reading out the public line trunk corresponding to the public line button detected by the public line button detection unit from the public line button list, for reading out the sender's information corresponding to the public line trunk read out from the trunk memory list, and for displaying the sender's number and the sender's name corresponding to the sender's information on the display of the one button telephone apparatus with reference to the operation of the public line button detected by the public line button detection unit.

3. The auto-exchange apparatus as recited in claim 1, wherein, when a user of the one button telephone apparatus places a call-in-progress of another public line trunk by operating the holding button and when the user of the one button telephone apparatus then operates the public line button corresponding to the one public line in order to receive the incoming call on the one public line trunk, the display of the one button telephone apparatus changes to display the sender's information of the incoming call from previously displaying the sender's information of the call-in-progress.

4. The auto-exchange apparatus as recited in claim 2, wherein, when a user of the one button telephone apparatus places a call-in-progress of another public line trunk by operating the holding button and when the user of the one button telephone apparatus then operates the public line button corresponding to the one public line in order to receive the incoming call on the one public line trunk, the display of the one button telephone apparatus changes to display the sender's information of the incoming call from previously displaying the sender's information of the call-in-progress.

\* \* \* \* \*